(12) United States Patent
Milton

(10) Patent No.: US 10,655,659 B2
(45) Date of Patent: *May 19, 2020

(54) DISTINCT STOPS OF A COMPRESSION WEDGE

(71) Applicant: Roxtec AB, Karlskrona (SE)

(72) Inventor: Stefan Milton, Ramdala (SE)

(73) Assignee: Roxtec AB, Karlskrona (SE)

( * ) Notice: Subject to any disclaimer, the term of this patent is extended or adjusted under 35 U.S.C. 154(b) by 77 days.

This patent is subject to a terminal disclaimer.

(21) Appl. No.: 15/571,730

(22) PCT Filed: May 3, 2016

(86) PCT No.: PCT/SE2016/050395
§ 371 (c)(1),
(2) Date: Nov. 3, 2017

(87) PCT Pub. No.: WO2016/178620
PCT Pub. Date: Nov. 10, 2016

(65) Prior Publication Data
US 2018/0156252 A1   Jun. 7, 2018

(30) Foreign Application Priority Data
May 4, 2015   (SE) ........................................ 1550561

(51) Int. Cl.
*F16B 2/14*   (2006.01)
*F16L 5/08*   (2006.01)
(Continued)

(52) U.S. Cl.
CPC .................. *F16B 2/14* (2013.01); *F16L 5/08* (2013.01); *F16L 5/14* (2013.01); *H02G 3/22* (2013.01); *F16L 2201/10* (2013.01)

(58) Field of Classification Search
CPC ....... F16B 2/14; F16L 5/08; F16L 5/14; F16L 2201/10; H02G 3/22
See application file for complete search history.

(56) References Cited

U.S. PATENT DOCUMENTS 3,282,544 A * 11/1966 Brattberg ................ F16L 3/227
248/56
5,433,487 A * 7/1995 Kuhn ........................ F16L 5/08
285/136.1
(Continued)

FOREIGN PATENT DOCUMENTS

CA         757231 A      4/1967
DE         3828012 A1    3/1989
(Continued)

OTHER PUBLICATIONS

International Search Report and Written Opinion for PCT/SE2016/050395 dated Aug. 23, 2016.

*Primary Examiner* — Eugene G Byrd
(74) *Attorney, Agent, or Firm* — Merchant & Gould P.C.

(57) ABSTRACT

The present invention concerns a compression wedge of a lead-through system. The wedge is moveable between two extremes and has distinct stops at the extremes. The distinct stops are given by co-operating stop edges (16, 17, 18, 23). In one embodiment two of the stop edges (16, 17) are provided on a screw (6). One end of the screw (6) is received inside a socket (7) fastened to a first wedge element (1). A second end of the screw (6) is fastened to a second wedge element (2). The socket (7) and screw (6) are mutually moveable in an axial direction of the screw (6). One stop edge (23) is provided in an inner opening (35) of the socket (7) and one stop edge (18) is provided in an opening of the first wedge element (1).

11 Claims, 3 Drawing Sheets

(51) Int. Cl.
*H02G 3/22* (2006.01)
*F16L 5/14* (2006.01)

(56) References Cited

U.S. PATENT DOCUMENTS

| | | | | |
|---|---|---|---|---|
| 5,938,152 | A | | 8/1999 | Kreutz |
| 6,129,391 | A | * | 10/2000 | Rakieski ............... F16L 25/009 285/337 |
| 8,096,562 | B2 | * | 1/2012 | Johansson ................ F16L 5/08 174/40 CC |
| 10,371,182 | B2 | * | 8/2019 | Milton ...................... F16B 2/14 |
| 2003/0110719 | A1 | | 6/2003 | Broder |
| 2004/0103600 | A1 | * | 6/2004 | Broder ...................... F16L 5/08 52/220.8 |
| 2007/0252341 | A1 | * | 11/2007 | Kreutz ...................... F16L 5/08 277/605 |
| 2009/0289452 | A1 | * | 11/2009 | Bennett ................. F16L 19/065 285/339 |
| 2012/0073872 | A1 | * | 3/2012 | Hildingsson .............. F16L 5/08 174/362 |
| 2015/0323110 | A1 | * | 11/2015 | Trivett .................... F16L 15/08 285/389 |
| 2015/0330562 | A1 | * | 11/2015 | Bonomi ............. E04F 11/1853 248/558 |

FOREIGN PATENT DOCUMENTS

| | | | |
|---|---|---|---|
| DE | 202006017469 U1 | 2/2007 | |
| JP | 2017072250 A * | 4/2017 | ............... H02G 3/22 |
| KR | 20100090583 A | 8/2010 | |
| WO | WO 2007/097706 A1 | 8/2007 | |
| WO | WO 2008/010755 A1 | 1/2008 | |
| WO | WO 2014/054848 A1 | 4/2014 | |

\* cited by examiner

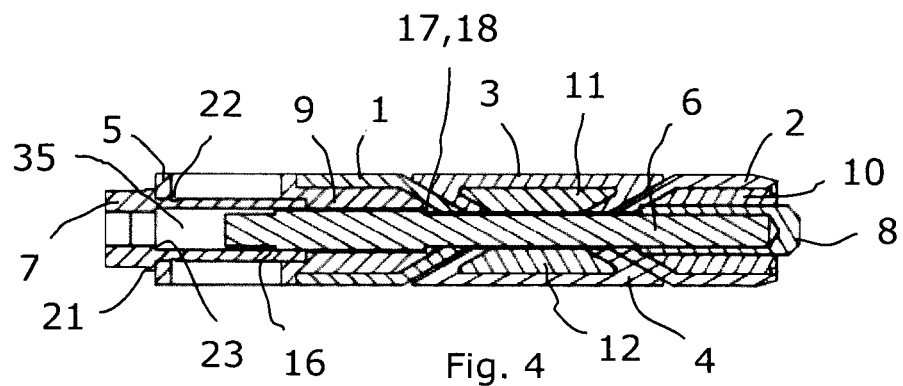
Fig. 4
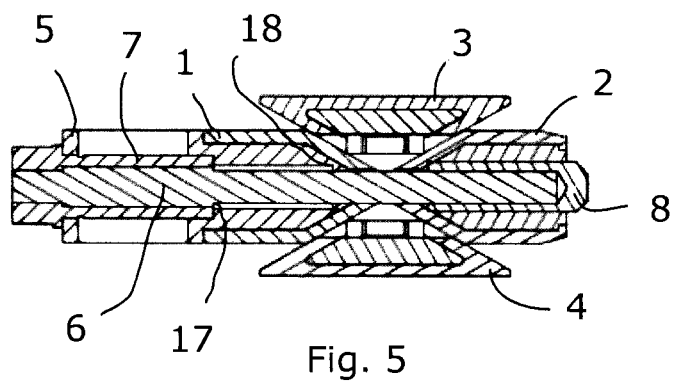
Fig. 5
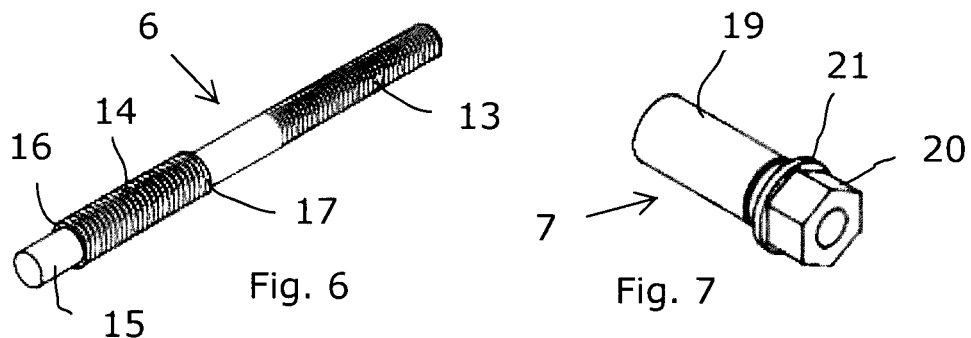
Fig. 6
Fig. 7
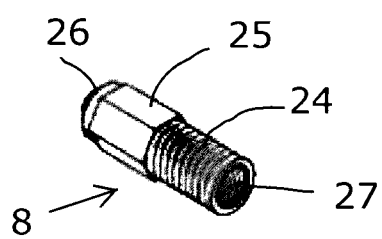
Fig. 8
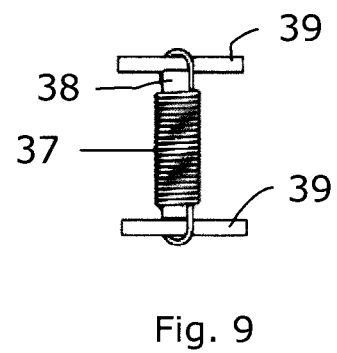
Fig. 9

DISTINCT STOPS OF A COMPRESSION WEDGE

This application is a National Stage Application of PCT/SE2016/050395, filed 3 May 2016, which claims benefit of Swedish Patent Application No. 1550561-3, filed 4 May 2015, which applications are incorporated herein by reference. To the extent appropriate, a claim of priority is made to each of the above disclosed applications.

TECHNICAL FIELD

The present invention concerns means to give distinct stops for a compression wedge of a lead-through system.

PRIOR ART

The present invention is mainly intended for a lead-through system comprising a frame, a number of modules, stay plates and a compression wedge. The modules, stay plates and the wedge are placed inside the frame. The modules are made of a compressible material and each module is to receive a cable, pipe or wire. The function of the stay plates is to hinder the modules from being pushed out of the frame in use. The wedge is a compression means which is to compress the modules in order for them to seal inwardly against the pipe, cable or wire and outwardly against other modules, stay plates and/or the frame, depending on placement inside the frame.

Lead-through systems of this kind are used in many different environments, such as for cabinets, technical shelters, junction boxes and machines and also decks and bulkheads of ships. They are used in different industrial environments, such as automotive, telecom, power generation and distribution as well as marine and offshore. They may have to seal against fluid, gas, fire, rodents, termites, dust, moisture etc.

In one wedge according to prior art (WO 96/11353), the wedge is moved between a non-compression state and a compression state by means of two screws, whereby each screw has threads with opposite pitches. The screws are connected to two wedge elements, which are moved towards each other if the screws are turned in a first direction and away from each other if the screws are turned in the opposite direction. The threads of the screw are in mesh with threads of the wedge elements, whereby the threads of one of the wedge elements are in mesh with threads of a first pitch of the screws and the threads of the other wedge element are in mesh with threads of an opposite pitch of the screws. Two further wedge elements are placed on sloping surfaces on opposite sides of the two first wedge elements, whereby the two further wedge elements will be moved toward and away from each other depending on the movement of the two first wedge elements. When the two further wedge elements are moved away from each other the thickness of the wedge increases, giving a compression force when placed inside the frame.

In lead-through systems of this kind it is vital that the compression force given by the wedge amount to a predetermined value. If the compression force is below said predetermined value there is a clear risk of not having a tight seal. In the wedge of prior art the decompression force is given when the screws are screwed out, whereby the distance between the screw heads and the wedge increases. Said distance is an indication of the applied compression force. Thus, the predetermined force is reached when the distance between the screw heads and the wedge amounts to a certain value. To establish that enough compression force has been applied said distance has to be measured. Such measuring is often cumbersome. In the wedge of the prior art there is no definite stops for the turning of the screws, which means that it is no way to know, without measuring the distance as discussed above, whether enough compression force has been applied or if unnecessarily high compression force has been applied.

SUMMARY

In view of the above, one object of the present invention is to provide distinct stops at end positions of a compression wedge, to give a clear response when said end positions are reached. Thus, the fitter will be able to establish that respective end position has been reached, without having to make any measuring or the like. This is especially beneficial for the compression state of the wedge, in order not to risk having a too low degree of compression. It is also beneficial with distinct stops when it is difficult to get a clear view of the screw or screws of the wedge.

According to one aspect of the present invention a compression wedge is provided, which wedge is moveable between a first extreme and a second extreme. The wedge has distinct stops at the first and second extremes. The distinct stops are given by co-operating stop edges.

According to a further aspect two stop edges are provided on a screw. One end of the screw is received inside a socket fastened to a first wedge element. A second end of the screw is fastened to a second wedge element. The socket and screw are mutually moveable in an axial direction of the screw. One stop edge is provided in an inner opening of the socket and one stop edge is provided in an opening of the first wedge element. The stop edges of the screw co-operate with the stop edge of the inner opening of the socket and the stop edge of the opening of the first wedge element, respectively, defining the distinct stops of the wedge.

Further objects and advantages of the present invention will be obvious to a person skilled in the art when reading the detailed description below of at present preferred embodiments.

BRIEF DESCRIPTION OF THE DRAWINGS

The present invention will be described further below by way of example and with reference to the enclosed drawings. In the drawings:

FIG. 4 is a sectional view of the wedge along the line A-A in FIG. 3 and in a non-compressing state, FIG. 5 is a sectional view, corresponding to FIG. 4, of the wedge in a compressing state, FIG. 6 is a perspective view of a screw forming a part of the wedge of FIGS. 2-5, FIG. 7 is a perspective view of a socket forming a part of the wedge of FIGS. 2-5, FIG. 8 is a perspective view of a nut forming a part of the wedge of FIGS. 2-5, FIG. 9 is a side view of a spring arrangement forming a part of the wedge of FIGS. 2-5.

DETAILED DESCRIPTION OF EMBODIMENTS

Figure 1:
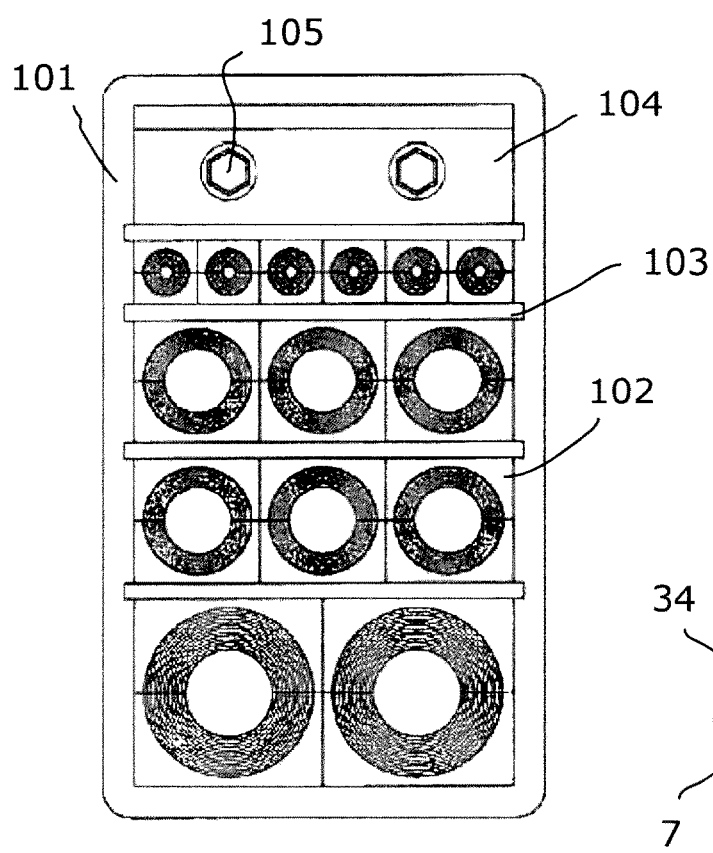
FIG. 1 is a front view of a lead-through system of the prior art, in which the wedge of the present invention may be used.
Figure 2:
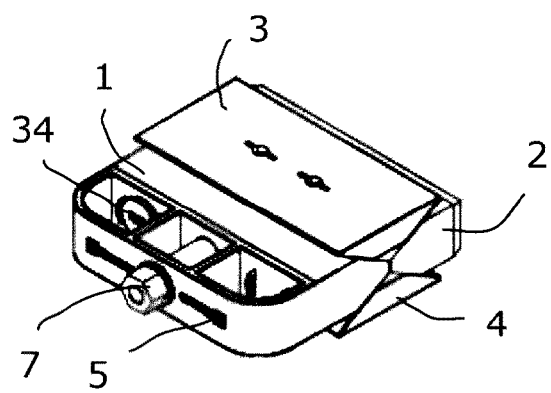
FIG. 2 is a perspective view of one embodiment of a wedge according to the present invention in a compressing state.

The compression wedge of the present invention is intended for use in a lead-through system as exemplified in FIG. 1. The exact form of the different parts of the lead-through system may vary. In the shown embodiment according to prior art a frame 101 receives a number of modules 102. The frame 101 is to be placed in a transition, such as a wall, roof or floor, and each module 102 is to receive a cable, wire or pipe. To assist in holding the modules 102 in place inside the frame 101 a number of stay plates 103 are arranged between each row of modules 102 inside the frame 101. The stay plates 103 are arranged moveable in longitudinal direction inside the frame 101, i.e. up and down as shown in FIG. 1. A wedge 104 according to prior art is placed at one inner end of the frame 101, with a stay plate 103 between the wedge 104 and the adjacent row of modules 102. The prior art wedge 104 is a compression unit and by means of screws 105 the wedge 104 can be expanded inside the frame 101. The expansion of the wedge 104 will act on the modules 102 inside the frame 101, whereby the modules 102 will be pressed against each other, against the stay plates 103, against the inner sides of the frame 101 and/or against any cable etc. received inside a module 102, depending on the placement of respective module 102.

The wedge of the present invention is to replace the prior art wedge 104 in a lead-through system, such as the one shown in FIG. 1. In one embodiment the wedge of the present invention comprises a first wedge element 1, a second wedge element 2, a third wedge element 3 and a fourth wedge element 4. The wedge further comprises a handle 5, a screw 6, a socket 7 and a nut 8.

The first wedge element 1 has a core 9 of a harder material than the surrounding material. In the same way the second wedge element 2 has a core 10 of harder material, the third wedge element 3 has a core 11 of harder material and the fourth wedge element 4 has a core 12 of harder material. The wedge elements 1, 2, 3, 4 are made of the same material and the core 9, 10, 11, 12 of each wedge element 1, 2, 3, 4 is made of the same material. Each wedge element 1, 2, 3, 4 is made of an elastic, compressible rubber material and the core 9, 10, 11, 12 of each wedge element 1, 2, 3, 4 is made of a composite material. The core 9, 10, 11, 12 of respective wedge element 1, 2, 3, 4 is made to be strong enough to withstand the expected forces without being compressed. In another embodiment each wedge element is made of only an elastic, compressible rubber material.

The first and second wedge elements 1, 2 are arranged in line with each other and moveable towards and away from each other. The third and fourth wedge elements 3, 4 are placed above each other and moveable towards and away from each other. The third and fourth wedge elements 3, 4 are placed between the first and second wedge elements 1, 2. The first wedge element 1 abuts the third wedge element 3 and the fourth wedge element 4 along sloped surfaces. The second wedge element 2 abuts the third wedge element 3 and the fourth wedge element 4 along sloped surfaces. The wedge elements 1, 2, 3, 4 and their co-operating sloped surfaces are arranged in such a way that when the first wedge element 1 and the second wedge element 2 are moved toward each other the third wedge element 3 and the fourth wedge element 4 are moved away from each other. Correspondingly, when the first wedge element 1 and the second wedge element 2 are moved away from each other the third wedge element 3 and the fourth wedge element 4 are allowed to move toward each other. The first wedge element 1 and the second wedge element 2 each have a through opening. Said through openings are placed in line with each other in the assembled wedge. In some embodiments the opening of the second wedge element 2 is not a through opening. The through opening of the first wedge element 1 has a larger diameter at a part facing away from the second wedge element 2 than at a part facing the second wedge element 2. Thereby, a stop edge 18 is formed inside the through opening of the first wedge element 1.

The screw 6 of the wedge is placed in the through openings of the first wedge element 1 and the second wedge element 2, respectively. The end of the screw 6 placed inside the second wedge element 2 has an outer thread 13. The opposite end of the screw 6, i.e. the end placed at the first wedge element 1, has also an outer thread 14, except for an outermost end 15. The outer diameter of the thread 14 placed at the first wedge element 1 is larger then the outer diameter of the outermost end 15 and the rest of the screw 6. A stop edge 16 is thereby formed at the junction between the thread 14 and the outermost end 15 and a stop edge 17 is formed at the junction between the thread 14 and the rest of the screw 6.

The socket 7 of the wedge has a tubular part 19 and forms a nut 20 at one end opposite the tubular part 19. A flange 21 is formed between the tubular part 19 and the nut 20, which flange 21 projects outwardly around the circumference of the tubular part 19 and is perpendicular to the tubular part 19. The socket 7 is made in one piece. A groove 22 is arranged on the outside of the tubular part 19, which groove 22 goes all around the circumference of the tubular part 19. The groove 22 is placed at a short distance from the flange 21 of the socket 7. The socket 7 has a through opening 35. The diameter of the through opening 35 is larger inside the tubular part 19 than inside the flange 21 and the nut 20. A stop edge 23 is thereby formed inside the through opening 35 of the socket 7. The through opening 35 has an inner thread in the area of the tubular part 19.

The nut 8 has a tubular part 24 at one end, having an outer thread. A polygonal part 25 follows the tubular part 24 and then comes an outer end 26. The outer end 26 is circular and chamfers towards the free end. Inside the tubular part 24 and the polygonal part 25 an inner opening 27 is arranged going from the free end of the tubular part 25 up to the outer end 26. There is no opening in the outer end 26. The inner opening 27 has an inner thread. The nut 8 is made in one piece.

Figure 3:
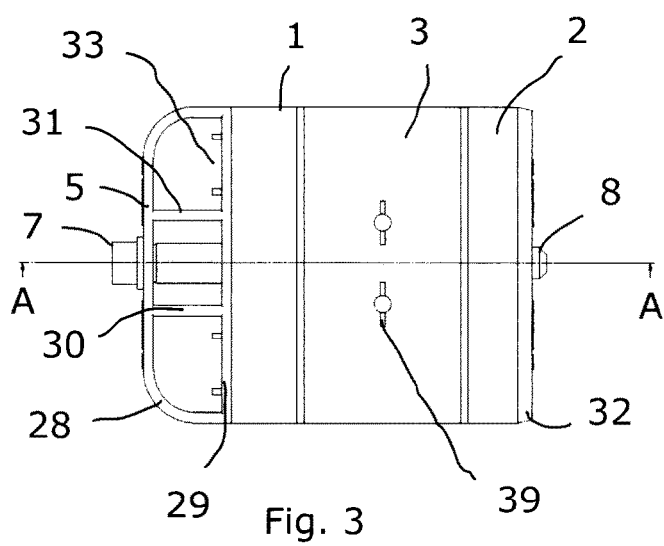
FIG. 3 is a plan view of the wedge of FIG. 2.
Figure 10:
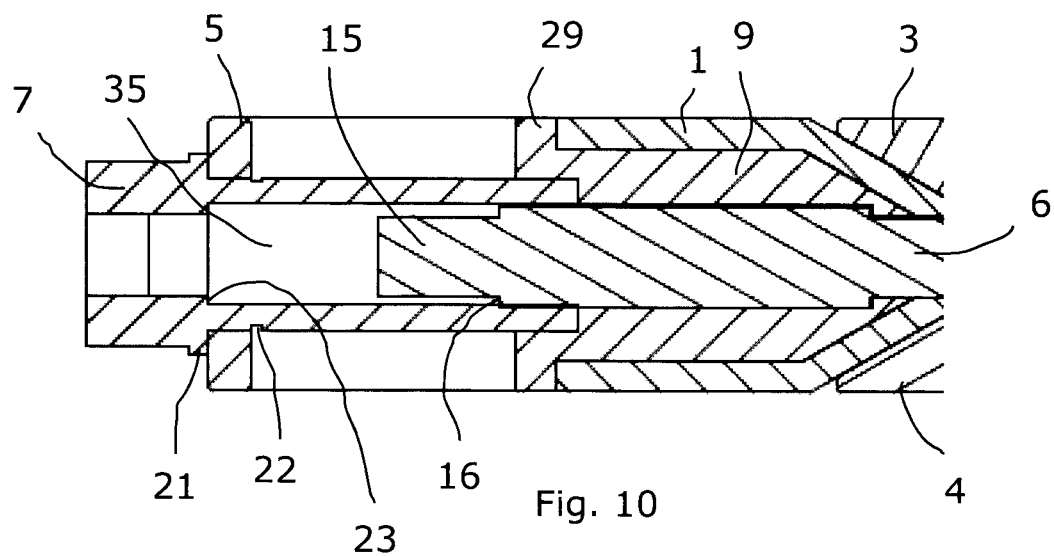
FIG. 10 is an enlarged sectional view of the left part of the wedge as seen in FIG. 4.
Figure 11:
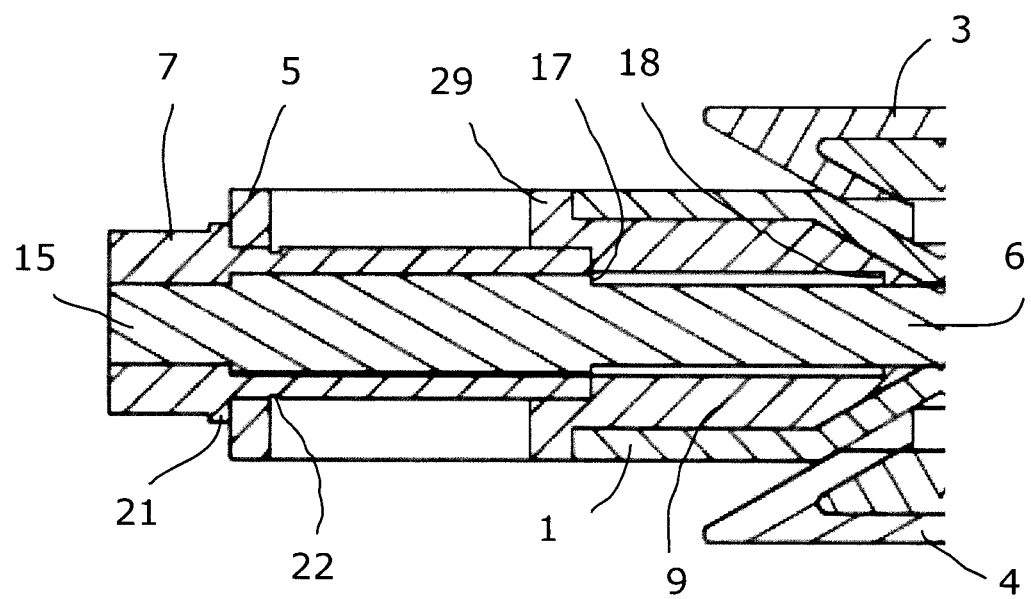
FIG. 11 is an enlarged sectional view of the left part of the wedge as seen in FIG. 5.

The handle 5 is integrated with the core 9 of the first wedge element 1. The handle 5 comprises an arc 28, an attachment plate 29 and two struts 30, 31, extending between the arc 28 and the attachment plate 29. The attachment plate 29 abuts the outer softer material of the first wedge element 1 and extends over the total width of the wedge. The arc 28 is placed at opposite ends of the attachment plate 29 and goes via two bent parts over into a straight part. The straight part of the arc 28 is placed at a distance from the attachment plate 29 and is parallel with the attachment plate 29. The straight part of the arc 28 has a through opening placed in the centre of said straight part. Also the attachment plate 29 has a through opening placed in line with the through opening of the arc 28. The struts 30, 31 are placed at a distance from each other, which distance should be at least big enough to give room for the socket 7. Furthermore, the attachment plate 29 has tag holders 33 placed on the side facing away from the first wedge element 1. As indicated in FIG. 3 the wedge can have a chamfer 32 at the outer end of the second wedge element 2, in order to facilitate insertion of the wedge into a frame. Normally all of the handle 5 and the core 9 of the first wedge element 1 are made in one piece.

The third and fourth wedge elements 3, 4 are connected to each other by two spring arrangements. Each spring arrangement comprises a spring 37, a rod 38 and two pins 39, as shown in FIG. 9. The spring 37 is placed surrounding the rod 38 in through openings of the third and fourth wedge elements 3, 4, which trough openings are placed in line with each other. At the mouth of each through opening on the outside of the third wedge element 3 and the fourth wedge element 4, respectively, there is an elongated groove crossing said mouth. Each end of the spring 37 is hooked around one of the pins 39, which pins 39 then are placed in one groove each. By means of the spring arrangements the third and fourth wedge elements 3, 4 will be urged in a direction towards each other.

A tag 34, such as a RFID tag, can be placed in one of the tag holders 33 of the handle 5. Due to the arc 28 of the handle the tag 34 is relatively well protected.

In the shown embodiment the nut 8 is fastened inside the second wedge element 2. The second wedge element 2 is in one embodiment formed around the tubular part 24 and the polygonal part 25 of the nut 8. The material of the second wedge element 2 will then go into the outer thread of the tubular part 25 and be placed abutting all of the sides of the polygonal part 25 of the nut 8. The nut 8 will thereby be held firmly inside the second wedge element 2 and be hindered to do any axial or rotational movements. The end opposite the outermost end 15 of the screw 6 is inserted into the nut 8. The screw 6 is screwed into the inner opening 27 of the nut, by means of co-operation between the thread 13 of the screw 6 and the thread of the inner opening 27 of the nut 8. The end of the screw 6 is locked from rotating inside the threaded opening 27 of the nut 8 by means of an adhesive, such as a threadlocker.

As stated above the screw 6 goes through a through opening of the first wedge element 1. In the assembled condition of the wedge the screw 6 goes between the third wedge element 3 and the fourth wedge element 4, respectively.

The socket 7 is placed going through a central through opening of the arc 28 of the handle 5 and through a central through opening of the attachment plate 29 of the handle 5. The outermost end 15 of the screw 6 is received inside the socket 7, whereby the thread 14 at the outermost end 15 of the screw 6 is received in the thread in the through opening 35 of the socket 7. Thus, by means of the thread of respective part the position of the outermost end 15 of the screw 6 may be varied inside the through opening 35 of the socket 7. The socket 7 is held at the arc 28 of the handle 5 by means of a locking ring being placed in the groove 22 on the outside of the tubular part 19 of the socket 7. The socket 7 is held by the locking ring in a rotatable way. The arc 28 is placed between the flange 21 of the socket 7 and the locking ring placed in the groove 22 of the socket 7. To hold the socket 7 at the handle 5 the distance between the flange 21 and the groove 22 of the socket 7 should about correspond with the thickness of the arc 28 of the handle 5.

In the assembled wedge the screw 6 is held stationary in relation to the second wedge element 2, without any rotation or axial movement, but may move axially in relation to the socket 7, by means of rotation for the socket 7 on the screw 6.

In use the wedge is moveable between two extremes. In a first extreme, as shown in FIG. 4, an upper surface of the third wedge element 3 is about flush with an upper surface of the first wedge element 1 and an upper surface of the second wedge element 2 and a lower surface of the fourth wedge element 4 is about flush with a lower surface of the first wedge element 1 and a lower surface of the second wedge element 2. This first extreme of the wedge could be called a flattened out position, as the wedge is as thin as it gets in that position. In said extreme the third and fourth wedge elements 3, 4 are abutting or are placed close to the screw 6. In a second extreme, as shown in FIG. 5, the first and second wedge elements 1, 2 are moved as close to each other as they can be moved and the third and fourth wedge elements 3, 4 are moved as far apart from each other as they can be moved. In the second extreme the wedge is as thick as it gets. In use the wedge may assume any position between the extremes, and including said extremes.

The different stop edges 16, 17, 18, 23 mentioned above co-operate to give a distinct stop at the first and second extreme, respectively, of the wedge. The stop edges 16, 17, 18, 23 further hinder movement beyond said first and second extremes of the wedge. In the first extreme the stop edge 17 at the inner end of the thread 14 placed at the outermost end 15 of the screw 6 will abut the stop edge 18 inside the through opening of the first wedge element 1. These stop edges 17, 18 will give a distinct stop of the movement flattening the wedge out. In the second extreme the stop edge 16 at the outermost end of the screw 6 will abut the stop edge 23 in the through opening 35 of the socket 7, giving a distinct stop in said second extreme. In the formed wedge the stop edge 16 of the screw 6 placed in the junction between the outermost end 15 and the thread 14 of the screw 6 is facing away from the second wedge element 2, while the stop edge 17 at the opposite end of the thread 14 of the screw 6 will be facing the second wedge element 2. In a corresponding way the stop edge 23 of the inner opening 35 of the socket 7 will be facing the second wedge element 2 and the stop edge 18 of the inner opening of the first wedge element 1 will be facing away from the second wedge element 2 of the formed wedge.

The wedge is normally placed inside the frame 101 with the wedge in the first extreme, whereby no compression force will be exerted on the modules 102 inside the frame 101. When the wedge is in the second extreme it will exert maximal compression force on the modules 102 inside the frame 101.

By rotating the socket 7, e.g. by means of a wrench placed on the nut 20 of the socket 7, in a first direction the wedge will go towards the first extreme and by rotating the socket in the opposite direction the wedge will go towards the second extreme. By rotation of the socket 7 the screw 6 will be moved axially in relation to the socket 7. This relative axial movement between the screw 6 and the socket 7 is given by co-operation between the threads 14 at the outermost end 15 of the screw 6 and the threads of the through opening 35 of the socket 7. By said relative axial movement between the screw 6 and the socket 7, the first and second wedge elements 1 and 2 are given a corresponding relative axial movement, moving the first and second wedge elements 1, 2 towards or away from each other, depending on the rotational direction of the socket 7. When the first and second wedge elements 1, 2 are moved towards each other the third and fourth wedge elements 3, 4 will be forced away from each other, sliding along the sloped surfaces of the first and second wedge elements 1, 2, respectively. When the first and second wedge elements 1, 2 are moved away from each other the third and fourth wedge elements 3, 4 are allowed to move toward each other, sliding along the sloped surfaces of the first and second wedge elements, 1, 2, respectively. The third and fourth wedge elements 3, 4 will be urged towards each other by means of the springs 37 connected to pins 39 placed in grooves on the outer surfaces of the third and fourth wedge elements 3, 4 and by means of the elastic modules 102 inside the frame 101.

The wedge is normally inserted into a frame in the flattened out condition, which is the first extreme of the wedge as defined above. The chamfers 32 at the outer end of the second wedge element 2 facilitate insertion of the wedge into the frame. If the wedge is to be removed from the frame the wedge is brought to the first extreme and then the wedge is drawn out by gripping the handle 5.

Even though the distinct stops are described in connection with a compression wedge having one screw, a person skilled in the art realizes that corresponding distinct stops can be arranged for wedges having more than one screw.

The invention claimed is:

1. A wedge of a lead-through system further comprising a frame, a number of modules and stay plates, which wedge is moveable between a first extreme and a second extreme, wherein the wedge comprises a first wedge element and a second wedge element placed in line with each other, and wherein the wedge comprises a third wedge element and a fourth wedge element placed on opposite sides of the first and second wedge elements and abutting the first and second wedge elements along sloping surfaces, wherein the wedge has distinct stops at the first extreme and at the second extreme, which distinct stops are given by co-operating stop edges of a screw, a first end of the screw is locked in a nut inside the second wedge element and that a second end of the screw is received in a socket, which socket is arranged fixed but rotatable in relation to the first wedge element.

2. The wedge of claim 1, wherein the socket is connected to the screw by means of an inner thread in an inner opening of the socket and an outer thread of the screw, whereby the screw and the socket are mutually moveable in axial direction of the screw.

3. The wedge of claim 1, wherein the nut is locked inside the second wedge element in such a way that it cannot move or rotate in relation to the second wedge element.

4. The wedge of claim 2, wherein the inner opening of the socket has a larger diameter in a part facing the second wedge element than in a part facing away form the second wedge element, whereby a stop edge is formed in the inner opening.

5. The wedge of claim 2, wherein the thread is placed at the second end of the screw, which thread ends at a distance from the end of the screw giving an outermost end of the screw without a thread, and wherein the diameter of the thread is larger than the diameter of the outermost end of the screw and than the diameter of the screw on the opposite side of the thread, whereby a stop edge is formed in the junction between the outermost end and the thread and a stop edge is formed in the junction between the thread and the rest of the screw at the side of the thread opposite the outermost end of the screw.

6. The wedge of claim 5, wherein the socket and the screw are received in a through opening of the first wedge element, which through opening of the first wedge element has a smaller diameter in a part facing the second wedge element than in a part facing away from the second wedge element, whereby a stop edge is formed at the junction between said parts of the inner opening of the first wedge element having different diameters.

7. The wedge of claim 6, wherein the distinct stop of the first extreme of the wedge is given by co-operation between the stop edge of the screw placed on the side of the thread facing the second wedge element and the stop edge of the inner opening of the first wedge element.

8. The wedge of claim 6, wherein the distinct stop of the second extreme of the wedge is given by co-operation between the stop edge of the screw placed on the side of the thread facing away from the second wedge element and the stop edge of the inner opening of the socket.

9. The wedge of claim 1, wherein the wedge elements and the sloping surfaces are so arranged that the third and fourth wedge elements will be moved away from each other when the first and second wedge elements are moved toward each other and the third and fourth wedge elements will be free to move toward each other when the first and second wedge elements are moved way from each other.

10. The wedge of claim 1, wherein the socket is fixed to a handle forming an integrated part with the first wedge element.

11. The wedge of claim 1, wherein the stop edges of the screw comprise screw thread.

* * * * *